(12) United States Patent
Oh

(10) Patent No.: US 10,900,442 B2
(45) Date of Patent: Jan. 26, 2021

(54) CYLINDER HEAD WITH INTEGRATED EXHAUST MANIFOLD AND ENGINE COOLING SYSTEM HAVING THE SAME

(71) Applicants: HYUNDAI MOTOR COMPANY, Seoul (KR); KIA Motors Corporation, Seoul (KR)

(72) Inventor: Mee Sun Oh, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 139 days.

(21) Appl. No.: 15/928,393

(22) Filed: Mar. 22, 2018

(65) Prior Publication Data

US 2019/0153975 A1 May 23, 2019

(30) Foreign Application Priority Data

Nov. 20, 2017 (KR) .................. 10-2017-0154953

(51) Int. Cl.
| | |
|---|---|
| F02F 1/40 | (2006.01) |
| F01N 13/10 | (2010.01) |
| F02F 1/42 | (2006.01) |
| F02F 7/00 | (2006.01) |
| F01P 3/02 | (2006.01) |

(Continued)

(52) U.S. Cl.
CPC ............... F02F 1/40 (2013.01); F01M 5/002 (2013.01); F01N 3/046 (2013.01); F01N 13/105 (2013.01); F01P 3/02 (2013.01); F01P 7/14 (2013.01); F01P 7/165 (2013.01); F02F 1/243 (2013.01); F02F 1/4264 (2013.01); F02F 7/007 (2013.01); F01P 2003/028 (2013.01); F01P 2007/146 (2013.01); F01P 2037/02 (2013.01); F01P 2060/16 (2013.01); F02F 2001/4278 (2013.01)

(58) Field of Classification Search
CPC ............ F02F 1/40; F02F 1/4264; F02F 7/007; F01M 5/002; F01N 13/105; F01P 3/02; F01P 7/14; F01P 2003/028; F01P 2007/146
USPC ...................................................... 123/41.33
See application file for complete search history.

(56) References Cited

U.S. PATENT DOCUMENTS

2007/0266967 A1* 11/2007 Shirabe ..................... F02F 1/38
                                                          123/41.82 R
2011/0271916 A1* 11/2011 Steiner ....................... F01P 3/02
                                                          123/41.82 R (Continued)

*Primary Examiner* — Joseph J Dallo
*Assistant Examiner* — Yi-Kai Wang
(74) *Attorney, Agent, or Firm* — McDonnell Boehnen Hulbert & Berghoff LLP

(57) ABSTRACT

A cylinder head with integrated exhaust manifold includes a cylinder head housing, an exhaust manifold, and first, second and third water jackets. The cylinder head housing has a combustion chamber formed in a bottom surface thereof and an internal receiving space. The exhaust manifold is received in the space of the cylinder head housing and is connected to exhaust ports of the cylinder head housing. The first water jacket is received in the space of the cylinder head housing and disposed adjacent to the combustion chamber. The second water jacket is received in the space of the cylinder head housing and disposed to contact a bottom of the exhaust manifold. The third water jacket is received in the space of the cylinder head housing and disposed to contact a top of the exhaust manifold.

10 Claims, 18 Drawing Sheets

(51) Int. Cl.
*F01P 7/14* (2006.01)
*F01M 5/00* (2006.01)
*F01P 7/16* (2006.01)
*F02F 1/24* (2006.01)
*F01N 3/04* (2006.01)

(56) References Cited

U.S. PATENT DOCUMENTS

| | | | |
|---|---|---|---|
| 2013/0239915 A1* | 9/2013 | Beyer | F02F 1/40 123/41.74 |
| 2014/0000536 A1* | 1/2014 | Glassford | F01P 3/20 123/41.08 |
| 2017/0022880 A1* | 1/2017 | Seeger | F01P 3/02 |
| 2017/0211457 A1* | 7/2017 | Kuhlbach | F01P 3/02 |

* cited by examiner

CYLINDER HEAD WITH INTEGRATED EXHAUST MANIFOLD AND ENGINE COOLING SYSTEM HAVING THE SAME

CROSS-REFERENCE TO RELATED APPLICATION

This application is based on and claims the benefit of priority to Korean Patent Application No. 10-2017-0154953, filed on Nov. 20, 2017, in the Korean Intellectual Property Office, the disclosure of which is incorporated herein in its entirety by reference.

TECHNICAL FIELD

The present disclosure relates to a cylinder head with integrated exhaust manifold and an engine cooling system having the same and, more particularly, to a cylinder head with integrated exhaust manifold and an engine cooling system having the same capable of effectively controlling the flow of a coolant to reduce emissions and significantly reduce costs and weight.

BACKGROUND

An internal combustion engine includes a cylinder block having at least one cylinder, and a cylinder head mounted on top of the cylinder block.

The internal combustion engine has an exhaust system for discharging exhaust gases from the cylinder. The cylinder head has an exhaust port that discharges the exhaust gases from the cylinder, and the exhaust gases discharged through the exhaust port are supplied to a catalytic converter through an exhaust manifold.

Meanwhile, a conventional exhaust manifold is manufactured as a separate component from an engine and is coupled to the cylinder head using bolts or a similar fastener. The exhaust manifold is exposed to the outside of the engine and is disposed separately in relation to the engine, so that the exhaust manifold is not cooled by a coolant passing through a water jacket, but is only cooled by the flow of air. Thus, the effect of cooling the exhaust gases discharged through the exhaust port may be reduced, and fuel efficiency may be lowered. By mounting the exhaust manifold separately from the engine, there are disadvantages of increased costs, a complicated engine structure, and noise generation by the exhaust gases.

To solve these problems, some vehicle manufacturers are developing a cylinder head with integrated exhaust manifold. However, when the exhaust gas temperature is lowered by the coolant, the catalyst light-off time in a diesel engine may increase, thereby increasing emissions such as NOx during initial starting of the engine.

Due to the above-described problems, it is difficult to mass produce the cylinder head with an integrated exhaust manifold, even though it has advantages of cost and weight reduction.

SUMMARY

The present disclosure has been made to solve the above-mentioned problems occurring in the prior art while maintaining the advantages achieved by the prior art.

An aspect of the present disclosure provides a cylinder head with an integrated exhaust manifold and an engine cooling system having the same, capable of effectively controlling the flow of a coolant to reduce emissions, and significantly reducing costs and weight.

According to an aspect of the present disclosure, a cylinder head with an integrated exhaust manifold may include: a cylinder head housing having a combustion chamber formed in a bottom surface thereof, an internal receiving space, and exhaust ports; an exhaust manifold received in the space of the cylinder head housing and connected to the exhaust ports of the cylinder head housing; a first water jacket received in the space of the cylinder head housing and disposed adjacent to the combustion chamber; a second water jacket received in the space of the cylinder head housing and disposed to contact a bottom of the exhaust manifold; and a third water jacket received in the space of the cylinder head housing and disposed to contact a top of the exhaust manifold.

The cylinder head housing may have a first coolant inflow port communicating with the first water jacket, and a second coolant inflow port communicating with the second water jacket.

The first coolant inflow port may communicate with a coolant passage of an external coolant duct attached to an external surface of a cylinder block.

The second coolant inflow port may communicate with a coolant passage provided inside a cylinder block.

According to another aspect of the present disclosure, an engine cooling system may include: a cylinder head having a first water jacket disposed adjacent to a combustion chamber, and a second water jacket and a third water jacket surrounding an exhaust manifold and communicating with each other; a cylinder block having a coolant passage communicating with the second water jacket; an external coolant duct attached to an external surface of the cylinder block, and having a coolant passage communicating with the first water jacket; a water pump supplying a coolant to the coolant passage of the external coolant duct; and a first valve disposed between the coolant passage of the external coolant duct and the coolant passage of the cylinder block.

One end of the external coolant duct may be connected to the water pump, and the other end of the external coolant duct may be connected to the first water jacket.

An exit of the third water jacket may be connected to an inlet of a heater.

A second valve may be disposed between the exit of the third water jacket and the heater, and the second valve may control a direction of flow of the coolant discharged from the third water jacket to adjust an amount of the coolant flowing into the heater.

The coolant discharged from the heater may be recirculated to the water pump.

The coolant passage of the cylinder block may be connected to an oil cooler.

A third valve may be disposed on an exit side of the oil cooler, and the oil cooler may be operated or stopped by opening or closing the third valve.

An exit of the first water jacket may be connected to an inlet of a radiator.

The coolant discharged from the radiator may be recirculated to the water pump.

A fourth valve may be disposed between the radiator and the water pump, and the radiator may be operated or stopped by opening or closing the fourth valve.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
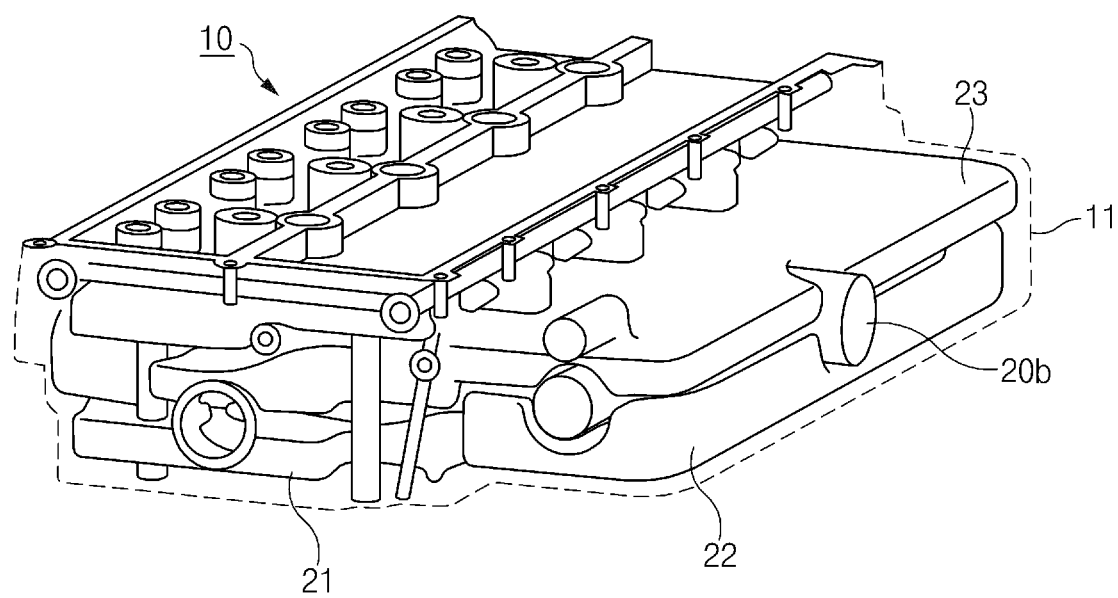
FIG. 1 illustrates a perspective view of a cylinder head with an integrated exhaust manifold, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be provided in order not to unnecessarily obscure the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
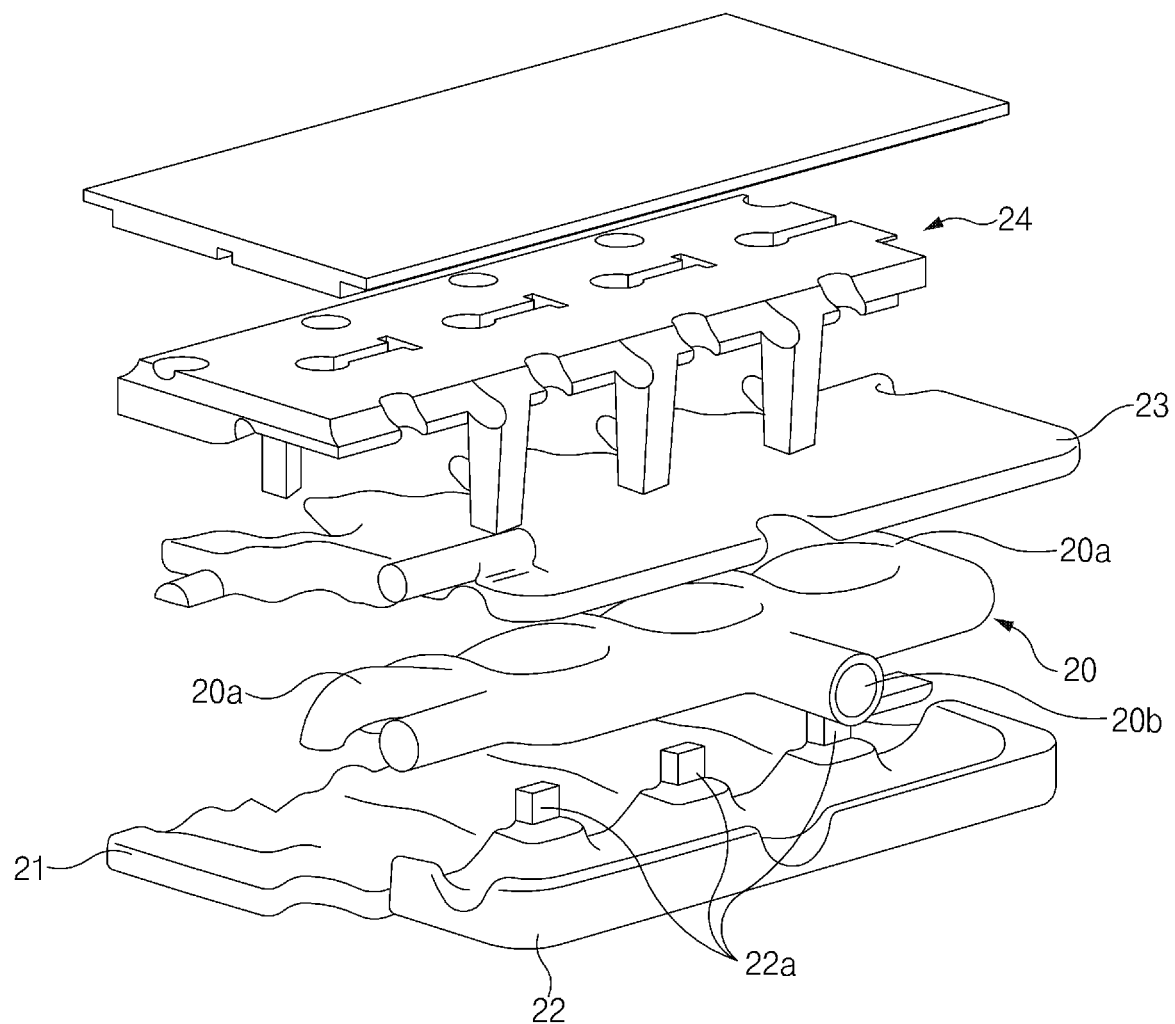
FIG. 2 illustrates an exploded perspective view of a cylinder head with an integrated exhaust manifold, from which a cylinder head housing is omitted, according to an exemplary embodiment of the present disclosure.
Figure 3:
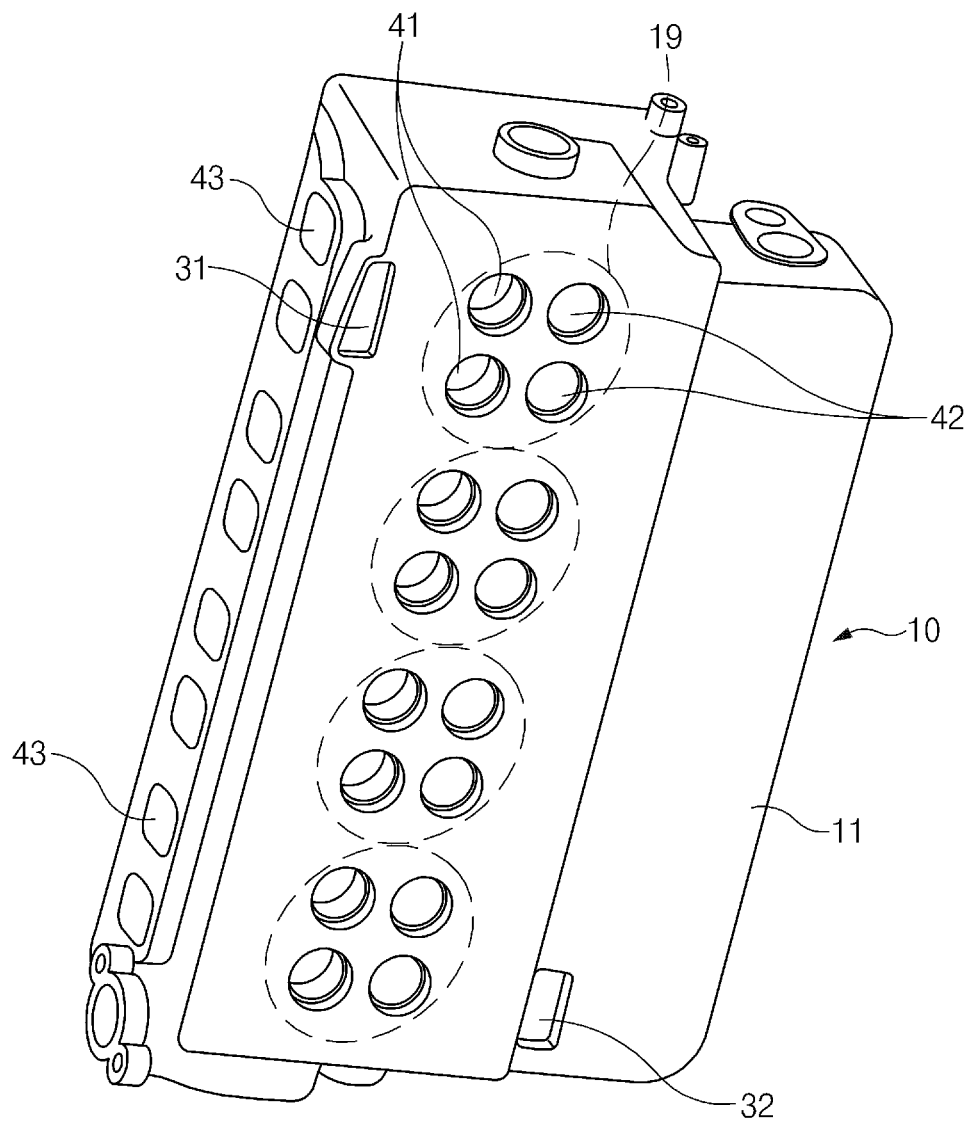
FIG. 3 illustrates a bottom perspective view of a cylinder head with an integrated exhaust manifold, according to an exemplary embodiment of the present disclosure.

Referring to FIGS. 1 to 3, a cylinder head 10 with an integrated exhaust manifold, according to an exemplary embodiment of the present disclosure, may include a cylinder head housing 11, an exhaust manifold 20 disposed in the cylinder head housing 11, a first water jacket 21 disposed adjacent to a combustion chamber 19 of the cylinder head 10, a second water jacket 22 disposed on the bottom of the exhaust manifold 20, and a third water jacket 23 disposed on the top of the exhaust manifold 20.

The cylinder head housing 11 may have an internal receiving space in which the exhaust manifold 20, the first water jacket 21, the second water jacket 22, and the third water jacket 23 are received. As the exhaust manifold 20, the first water jacket 21, the second water jacket 22, and the third water jacket 23 are received in the space of the cylinder head housing 11, a structure in which the exhaust manifold 20 is integrated with the cylinder head housing 11 may be effectively famed.

As illustrated in FIG. 3, the cylinder head housing 11 may have a plurality of combustion chambers 19 recessed in a bottom surface thereof, and each combustion chamber 19 may be provided with a plurality of intake ports 41 and a plurality of exhaust ports 42. A combustion chamber of each cylinder may be formed by the recessed combustion chamber 19 of the cylinder head 10 and a combustion chamber of a piston.

The cylinder head housing 11 may have a plurality of intake openings 43 formed in a rear surface thereof. The plurality of intake openings 43 may individually communicate with a plurality of intake ports 41 through a plurality of intake ducts (not shown). Air may be introduced through each intake opening.

The cylinder head housing 11 may have a first coolant inflow port 31 and a second coolant inflow port 32 formed in the bottom surface thereof.

The exhaust manifold 20 may include a plurality of runners 20a individually connected to the exhaust ports 42 of the cylinder head housing 11. The plurality of runners 20a may merge into a collector 20b, and the collector 20b may be connected to a turbine (not shown) of a turbocharger through an exhaust pipe (not shown).

The first water jacket 21 may have a passage (not shown) through which a coolant flows. The passage of the first water jacket 21 may communicate with the first coolant inflow port 31, such that the coolant may flow into the passage of the first water jacket 21 through the first coolant inflow port 31.

The first coolant inflow port 31 may communicate with a coolant passage 18 of an external coolant duct 17 to be described later, such that the first water jacket 21 may receive the coolant from the coolant passage 18 of the external coolant duct 17.

The first water jacket 21 may be disposed adjacent to the combustion chamber 19 of the cylinder head 10, such that the first water jacket 21 may be adjacent to the combustion chamber of each cylinder. Thus, the combustion chamber 19 of the cylinder head 10 and the combustion chamber of each cylinder may be effectively cooled by the coolant flowing through the passage of the first water jacket 21.

The second water jacket 22 may have a passage (not shown) through which the coolant flows. The passage of the second water jacket 22 may communicate with the second coolant inflow port 32, such that the coolant may flow into the passage of the second water jacket 22 through the second coolant inflow port 32. The second water jacket 22 may have at least one connecting passage 22a communicating with the third water jacket 23.

The second coolant inflow port 32 may communicate with a coolant passage 6 formed in a cylinder block 5, such that the second water jacket 22 may receive the coolant from the coolant passage 6 of the cylinder block 5. The coolant passage 6 may be formed around each cylinder of the cylinder block 5, such that each cylinder may be cooled by the coolant flowing through the coolant passage 6. When an engine is initially started, the coolant may not be supplied to the second water jacket 22 and the third water jacket 23. In this configuration, exhaust gas temperature may not be lowered at the initial starting of the engine, and thus an increase in catalyst light-off time may be prevented, and emissions may be significantly reduced.

The second water jacket 22 may be disposed to contact the bottom of the exhaust manifold 20, and the exhaust manifold 20 may be cooled by the coolant flowing through the passage of the second water jacket 22.

The third water jacket 23 may have a passage (not shown) through which the coolant flows. The passage of the third water jacket 23 may communicate with the passage of the second water jacket 22 through the connecting passage 22a, such that the coolant may flow from the passage of the second water jacket 22 to the passage of the third water jacket 23 through the connecting passage 22a.

The third water jacket 23 may be disposed to contact the top of the exhaust manifold 20, such that the exhaust manifold 20 may be cooled by the coolant flowing through the passage of the third water jacket 23.

An oil jacket 24 may be disposed on top of the third water jacket 23, and the oil jacket 24 may communicate with an oil circuit (not shown) of the engine.

As the second water jacket 22 and the third water jacket 23 are disposed on the bottom and top of the exhaust manifold 20, respectively, the coolant may pass through the second water jacket 22 and move to the third water jacket 23, thereby sequentially cooling the bottom and top of the exhaust manifold 20. Thus, exhaust gases discharged from the exhaust manifold 20 may be cooled appropriately.

The first water jacket 21, the second water jacket 22, and the third water jacket 23 may have contoured surfaces and holes corresponding to external surfaces of the exhaust manifold 20. The exhaust manifold 20 may be surrounded by the first water jacket 21, the second water jacket 22, and the third water jacket 23, thereby being integrated into the cylinder head 10.

As described above, since the coolant is separately supplied to the first water jacket 21, and to the second and third water jackets 22 and 23, cooling of a combustion chamber (not shown) of the engine and cooling of the exhaust gases may be effectively controlled. Thus, improved fuel efficiency and emissions reduction may be effectively achieved.

Figure 4:
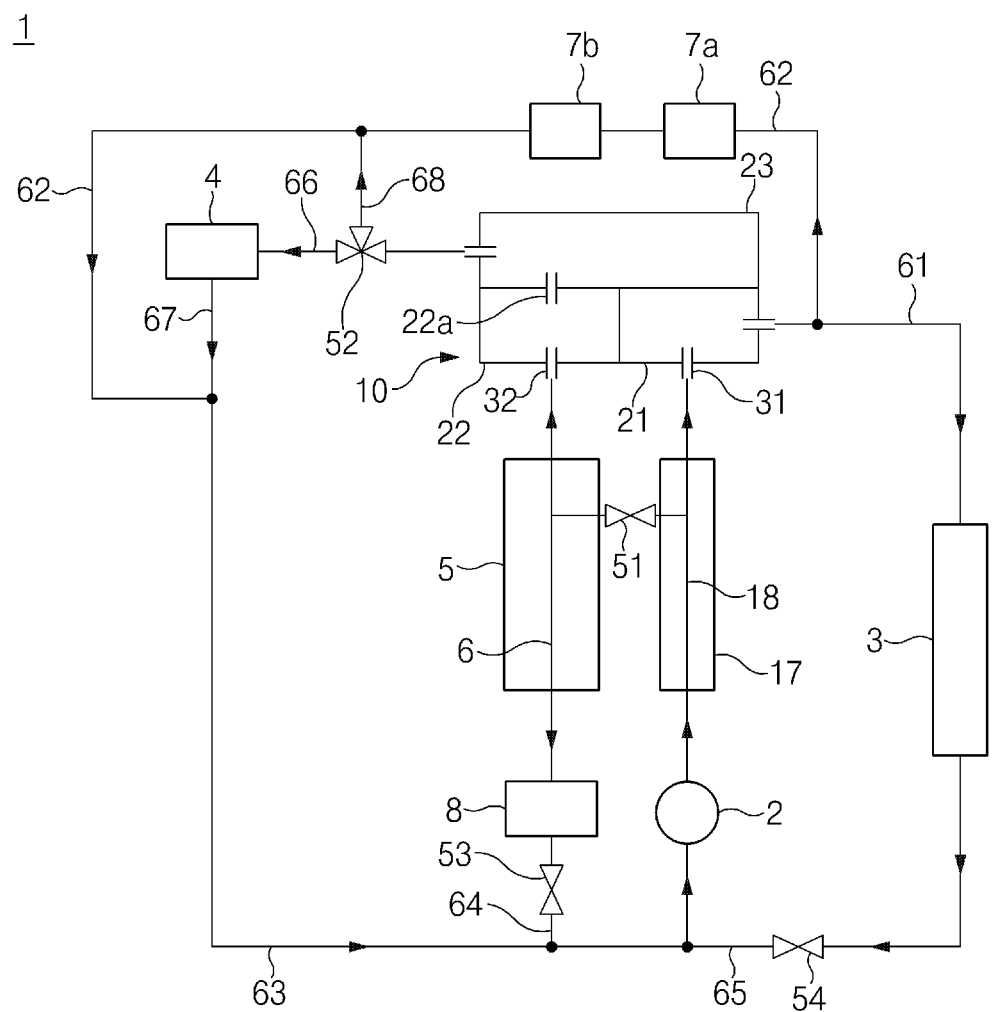
FIG. 4 illustrates a block diagram of an engine cooling system, according to an exemplary embodiment of the present disclosure.

Referring to FIG. 4, an engine cooling system 1, according to an exemplary embodiment of the present disclosure, may include a water pump 2 supplying the coolant to the cylinder block 5 and the cylinder head 10 of the engine, and a radiator 3 cooling the coolant discharged from the cylinder head 10.

Figure 5:
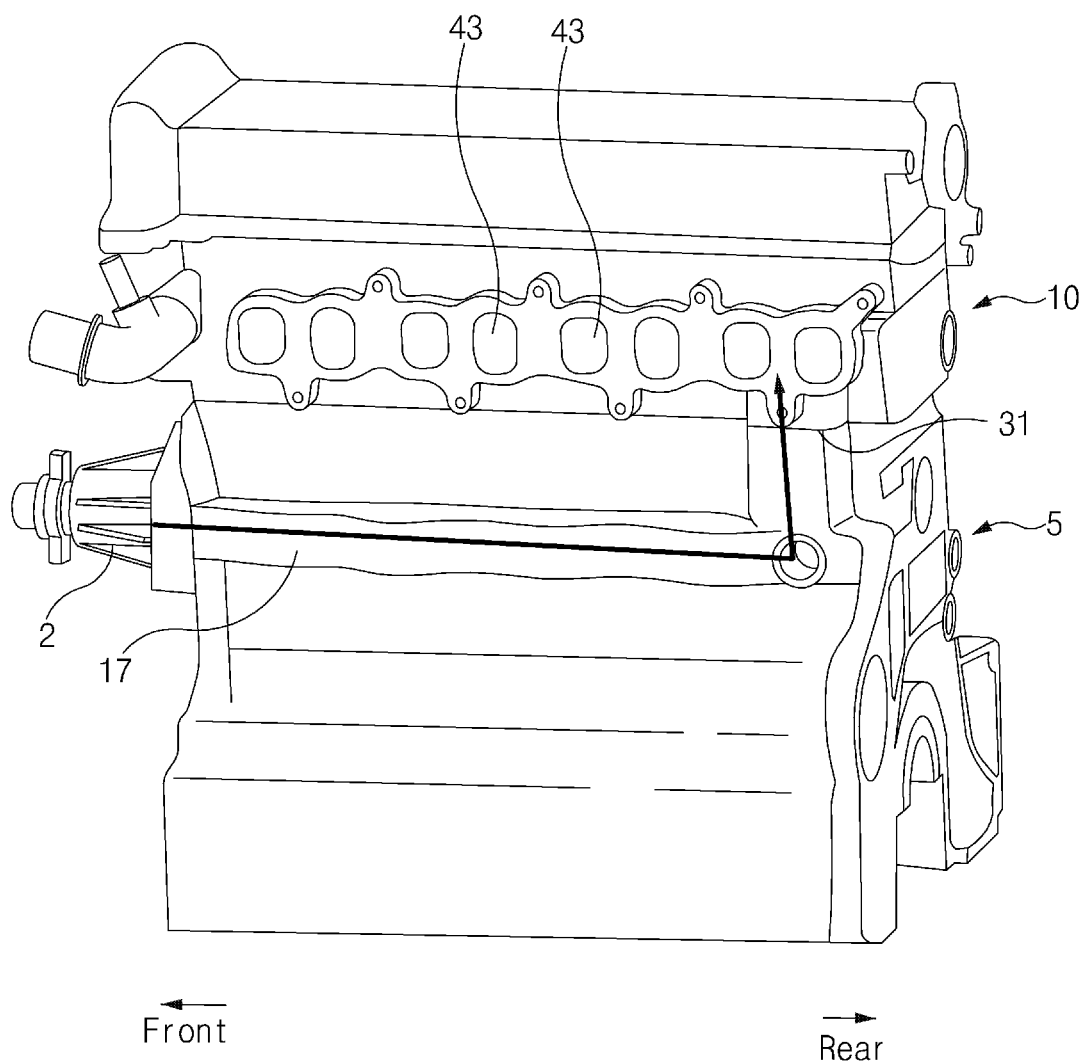
FIG. 5 illustrates a rear perspective view of an engine to which a cylinder head with integrated exhaust manifold according to an exemplary embodiment of the present disclosure is applied.

As illustrated in FIG. 5, the water pump 2 may be attached to one side surface of the cylinder block 5, and the external coolant duct 17 may be disposed between the water pump 2 and the cylinder head 10. The external coolant duct 17 may be attached to an external surface of the cylinder block 5. The external coolant duct 17 may have the coolant passage 18 through which the coolant flows. In particular, by attaching the external coolant duct 17 to a rear surface of the cylinder block 5 as illustrated in FIG. 5, a layout of the engine may become more compact.

One end of the external coolant duct 17 may be connected to the water pump 2, and the other end of the external coolant duct 17 may be connected to the first coolant inflow port 31 communicating with the passage of the first water jacket 21. The coolant supplied by the water pump 2 may pass through the coolant passage 18 of the external coolant duct 17 and the first coolant inflow port 31 to flow into the passage of the first water jacket 21.

As illustrated in FIG. 4, a first valve 51 may be disposed between the coolant passage 18 of the external coolant duct 17 and the coolant passage 6 of the cylinder block 5. When the first valve 51 is opened, the coolant may be supplied from the coolant passage 18 of the external coolant duct 17 to the coolant passage 6 of the cylinder block 5. When the first valve 51 is closed, the coolant may not be supplied from the coolant passage 18 of the external coolant duct 17 to the coolant passage 6 of the cylinder block 5.

An outlet of the first water jacket 21 may be connected to an inlet of the radiator 3 through a first passage 61, and the coolant discharged from the first water jacket 21 may flow into the inlet of the radiator 3 through the first passage 61. The radiator 3 may cool the coolant by the air, thereby dissipating heat of the coolant to the outside.

An outlet of the radiator 3 may be connected to the water pump 2 through a fifth passage 65. A fourth valve 54 may be provided in the fifth passage 65, and the opening or closing of the fourth valve 54 may actuate or stop the radiator 3. The coolant discharged from the radiator 3 may be recirculated to the water pump 2 through the fifth passage 65.

Figure 8:
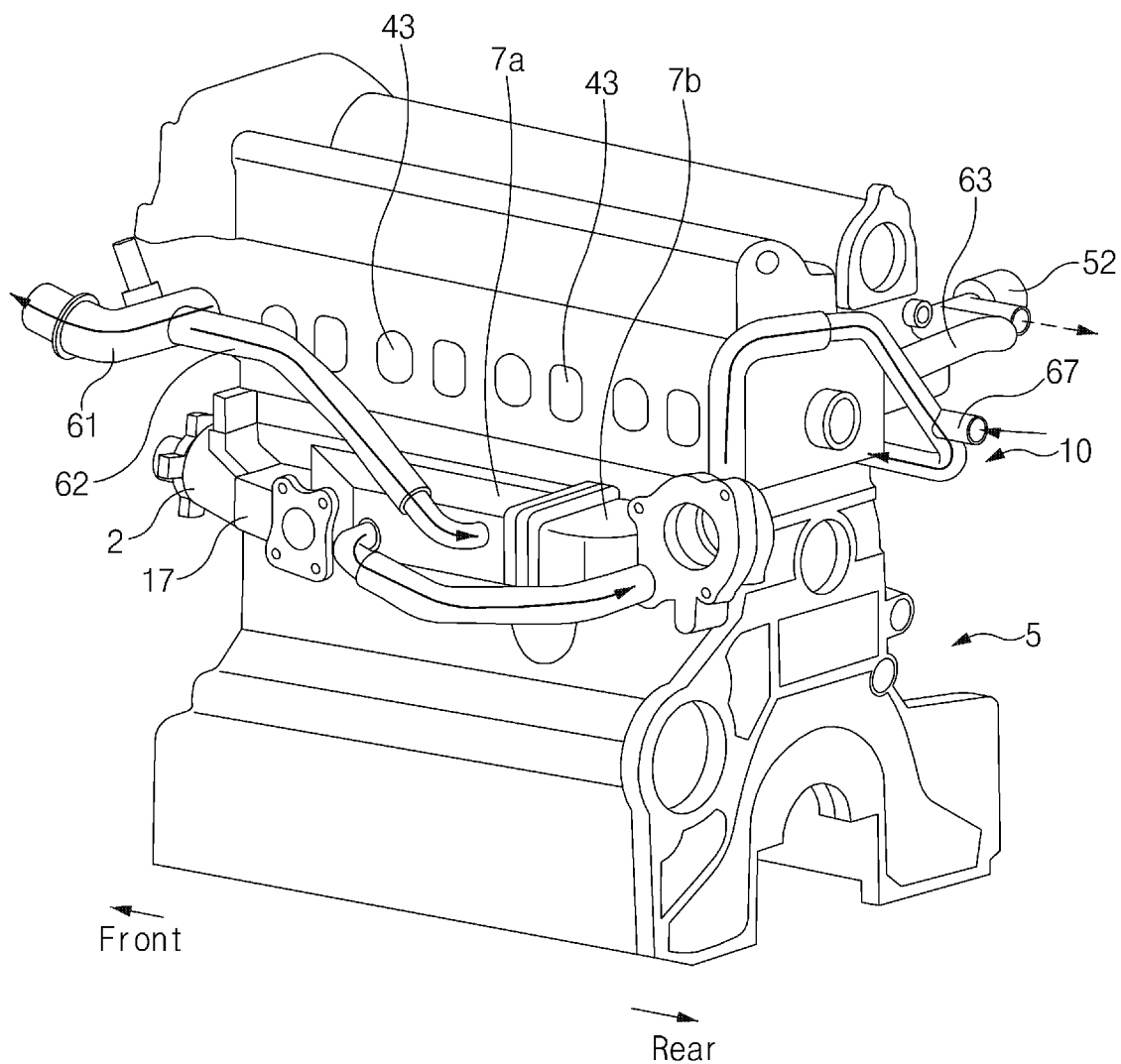
FIG. 8 illustrates a rear perspective view of an engine to which a cylinder head with an integrated exhaust manifold according to an exemplary embodiment of the present disclosure is applied.
Figure 9:
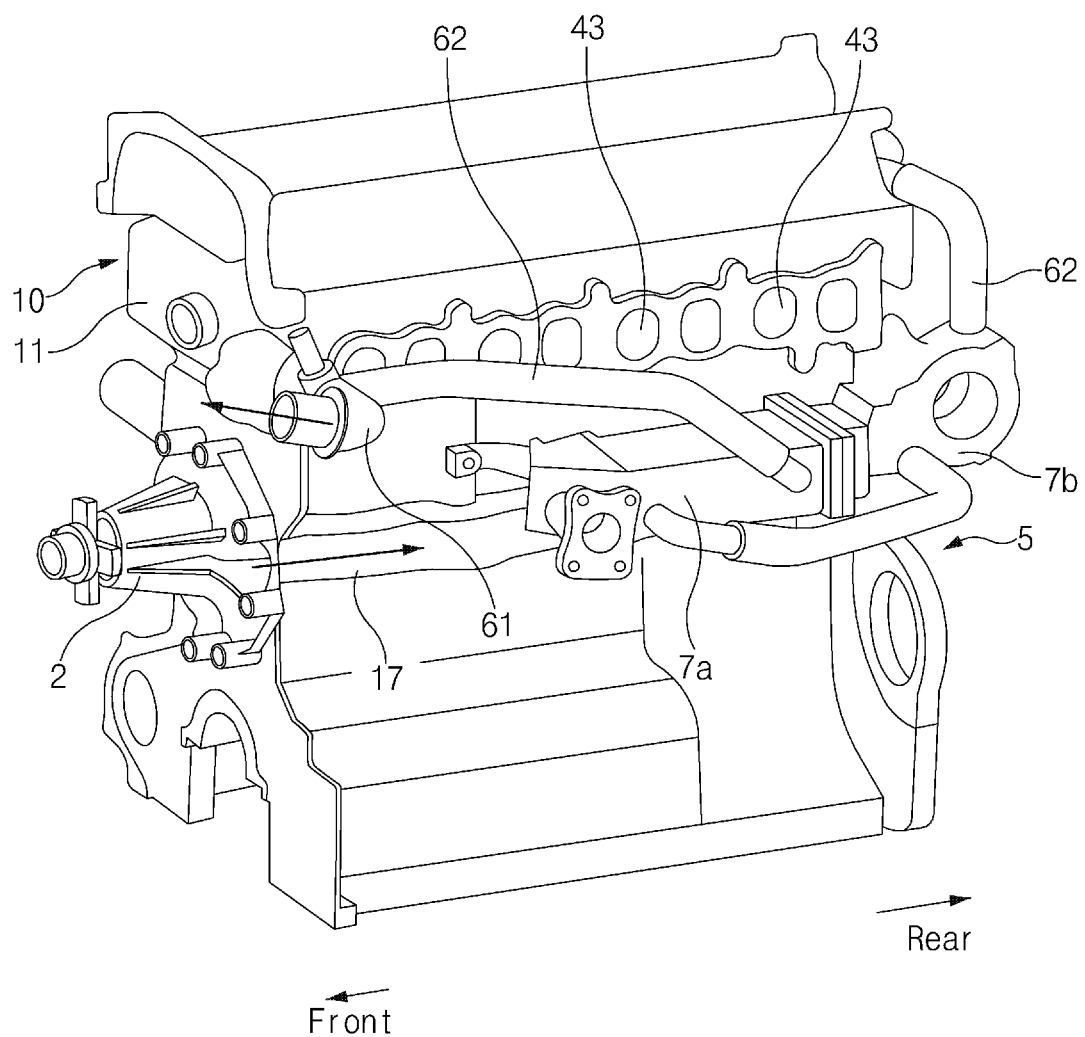
FIG. 9 illustrates a rear perspective view of an engine to which a cylinder head with an integrated exhaust manifold according to an exemplary embodiment of the present disclosure is applied.

As illustrated in FIGS. 4, 8, and 9, the first passage 61 may be connected to a second passage 62, and an exhaust gas recirculation ("EGR") cooler 7a and an EGR valve 7b may be provided in the second passage 62. A portion of the coolant discharged from the first water jacket 21 may flow through the EGR cooler 7a and the EGR valve 7b. The EGR cooler 7a and the EGR valve 7b may be configured to cool exhaust gases that are recirculated from an exhaust pipe to an intake pipe. The EGR cooler 7a and the EGR valve 7b may be disposed on the rear surface of the cylinder block 5 as illustrated in FIGS. 8 and 9.

One outlet of the coolant passage 6 of the cylinder block 5 may be connected to an inlet of the second water jacket 22, such that the coolant may be supplied from the coolant passage 6 of the cylinder block 5 to the second water jacket 22 through the second coolant inflow port 32. The second water jacket 22 and the third water jacket 23 may communicate with each other through the connecting passage 22a.

passage 64. The third valve 53 may be a thermostat valve that controls an amount of the coolant flowing through the oil cooler 8. The opening and closing of the third valve 53 may actuate or stop the oil cooler 8.

Figure 6:
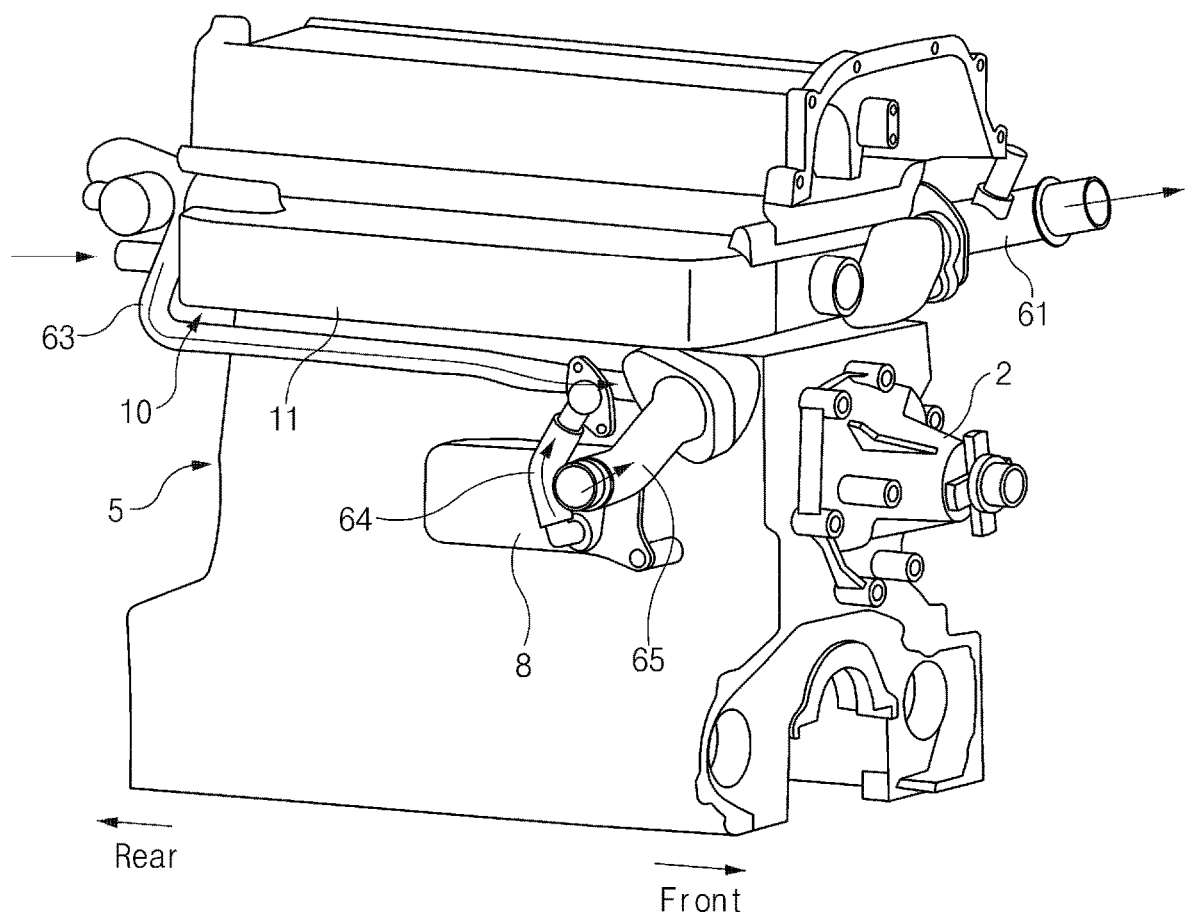
FIG. 6 illustrates a front perspective view of an engine to which a cylinder head with an integrated exhaust manifold according to an exemplary embodiment of the present disclosure is applied.
Figure 7:
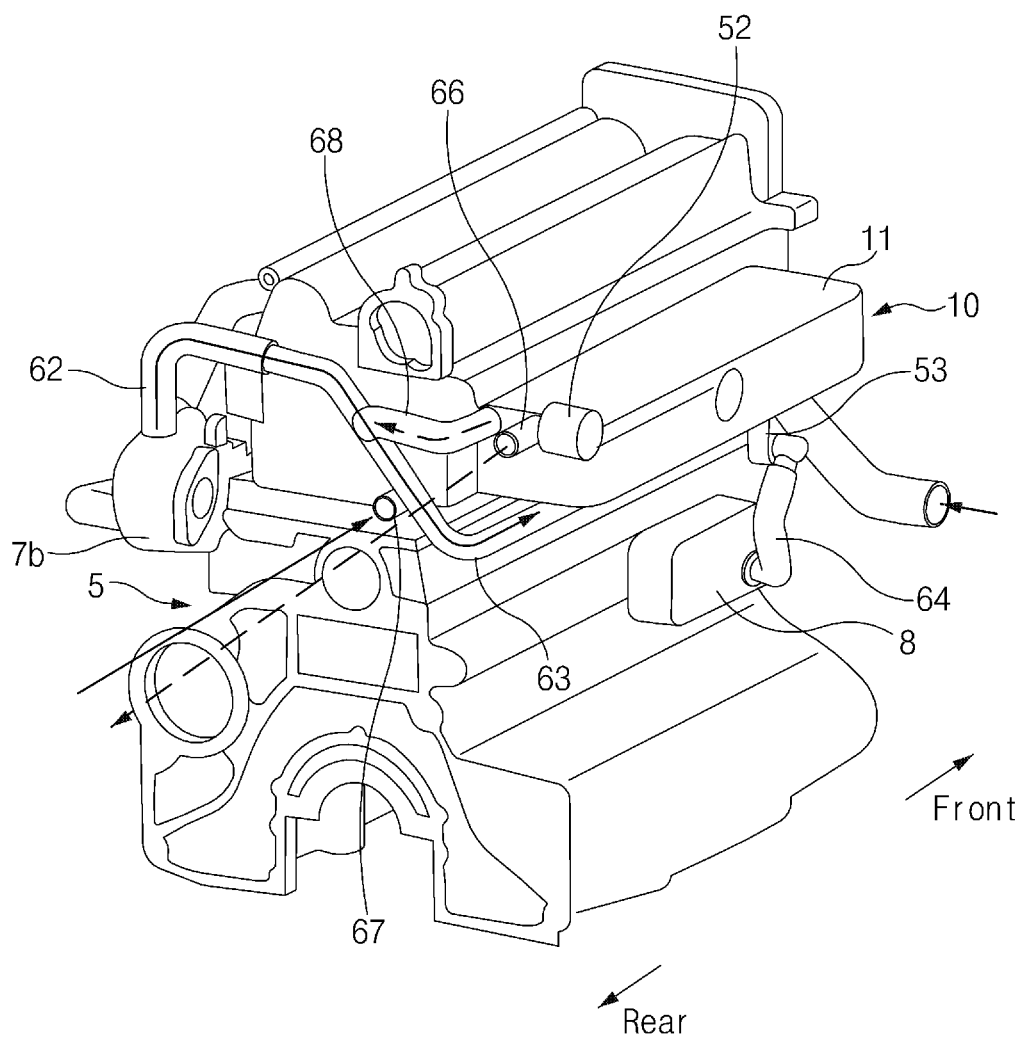
FIG. 7 illustrates a front perspective view of an engine to which a cylinder head with an integrated exhaust manifold according to an exemplary embodiment of the present disclosure is applied.

As illustrated in FIGS. 6 and 7, the oil cooler 8 may be disposed on the front side of the cylinder block 5, and the oil cooler 8 may cool oil that circulates in the cylinder head 10 and/or the cylinder block 5.

Table 1 shows the flow state of the coolant by the operations of the first valve 51, the second valve 52, the third valve 53, and the fourth valve 54.

TABLE 1

|  | First Valve | Second Valve | Third Valve | Fourth Valve | First Water Jacket | Second & Third Water Jacket | Cylinder Block | Radiator | EGR | Heater | Oil Cooler |
|---|---|---|---|---|---|---|---|---|---|---|---|
| First Operating State | X | Heater | X | X | ○ | X | X | X | ○ | X | X |
| Second Operating State | ○ | Heater | X | X | ○ | ○ | ○ | X | ○ | ○ | X |
| Third Operating State | ○ | Bypass | X | X | ○ | ○ | ○ | X | ○ | X | X |
| Fourth Operating State | ○ | Heater | ○ | X | ○ | ○ | ○ | X | ○ | ○ | ○ |
| Fifth Operating State | ○ | Bypass | ○ | X | ○ | ○ | ○ | X | ○ | X | ○ |
| Sixth Operating State | ○ | Heater | X | ○ | ○ | ○ | ○ | ○ | ○ | ○ | X |
| Seventh Operating State | ○ | Bypass | X | ○ | ○ | ○ | ○ | ○ | ○ | X | X |
| Eighth Operating State | ○ | Heater | ○ | ○ | ○ | ○ | ○ | ○ | ○ | ○ | ○ |
| Ninth Operating State | ○ | Bypass | ○ | ○ | ○ | ○ | ○ | ○ | ○ | X | ○ |

An outlet of the third water jacket 23 may be connected to an inlet of a heater 4, and a second valve 52 may be disposed between the outlet of the third water jacket 23 and the heater 4. The second valve 52 may be a three-way valve having a single inlet port and two outlet ports. As illustrated in FIG. 4, the inlet port may communicate with the outlet of the third water jacket 23. One outlet port may communicate with the inlet of the heater 4 through a sixth passage 66, and the other outlet port may communicate with the second passage 62 through an eighth passage 68. When the outlet port communicating with the heater 4 is opened, the coolant may flow into the heater 4 through the sixth passage 66. When the outlet port communicating with the second passage 62 is opened, the coolant may be bypassed to the second passage 62 through the eighth passage 68. As illustrated in FIG. 7, the second valve 52 may be disposed on the front side of the cylinder head, and the two outlet ports of the second valve 52 may be connected to the sixth passage 66 and the eighth passage 68, respectively.

The heater 4 may heat an interior space of a vehicle using the coolant. The coolant discharged from the third water jacket 23 may flow into the heater 4 through the sixth passage 66 or be bypassed to the second passage 62 through the eighth passage 68 by the operation of the second valve 52. As described above, the second valve 52 may control a direction of flow of the coolant discharged from the third water jacket 23 to thereby adjust an amount of the coolant flowing into the heater 4.

An outlet of the heater 4 may be connected to a seventh passage 67. The seventh passage 67 and the second passage 62 may merge into a third passage 63, and the third passage 63 may be connected to an inlet of the water pump 2. Thus, the coolant discharged from the heater 4 may be recirculated to the water pump 2.

Figure 10:
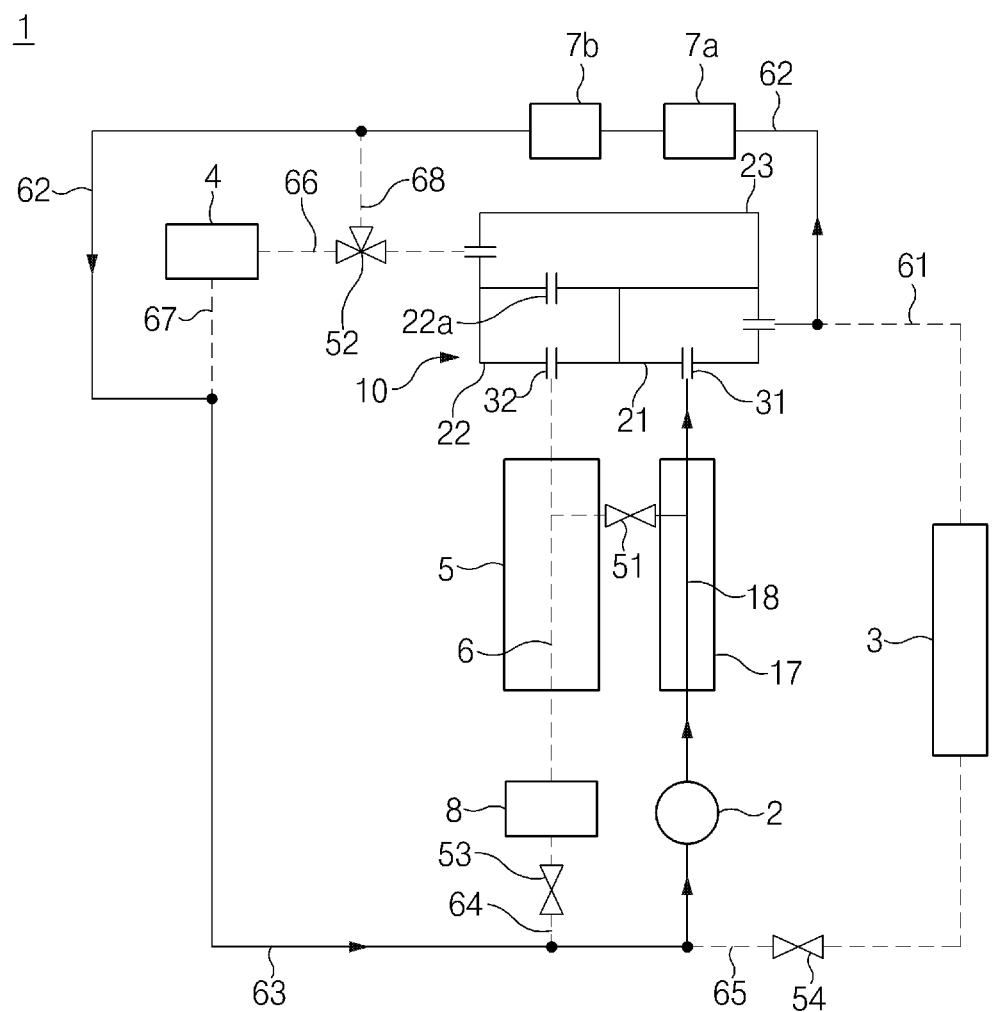
FIG. 10 illustrates a first operating state of an engine cooling system, according to an exemplary embodiment of the present disclosure.

As illustrated in FIG. 4, the other outlet of the coolant passage 6 of the cylinder block 5 may be connected to an inlet of the oil cooler 8, and an outlet of the oil cooler 8 may be connected to the third passage 63 through a fourth passage 64. A third valve 53 may be provided in the fourth FIG. 10 illustrates a first operating state of the engine cooling system in table 1 when the engine is initially started. As the first valve 51 is closed, the coolant may not flow into the coolant passage 6 of the cylinder block 5, and thus the coolant may not be supplied to the second water jacket 22 and the third water jacket 23. The second valve 52 may open the outlet port thereof communicating with the heater 4, but the coolant may not be supplied to the heater 4 since the coolant is not supplied to the third water jacket 23. The coolant may be supplied to the first water jacket 21 by the operation of the water pump 2, such that the coolant may be supplied to the EGR cooler 7a and the EGR valve 7b. As the third valve 53 is closed, the oil cooler 8 may not operate, and as the fourth valve 54 is closed, the radiator 3 may not operate.

As described above, when the engine is initially started, the coolant may not be supplied to the second water jacket 22 and the third water jacket 23. In this configuration, the exhaust gas temperature may not be lowered at the initial starting of the engine. Thus, an increase in catalyst light-off time may be prevented and emissions may be significantly reduced.

Figure 11:
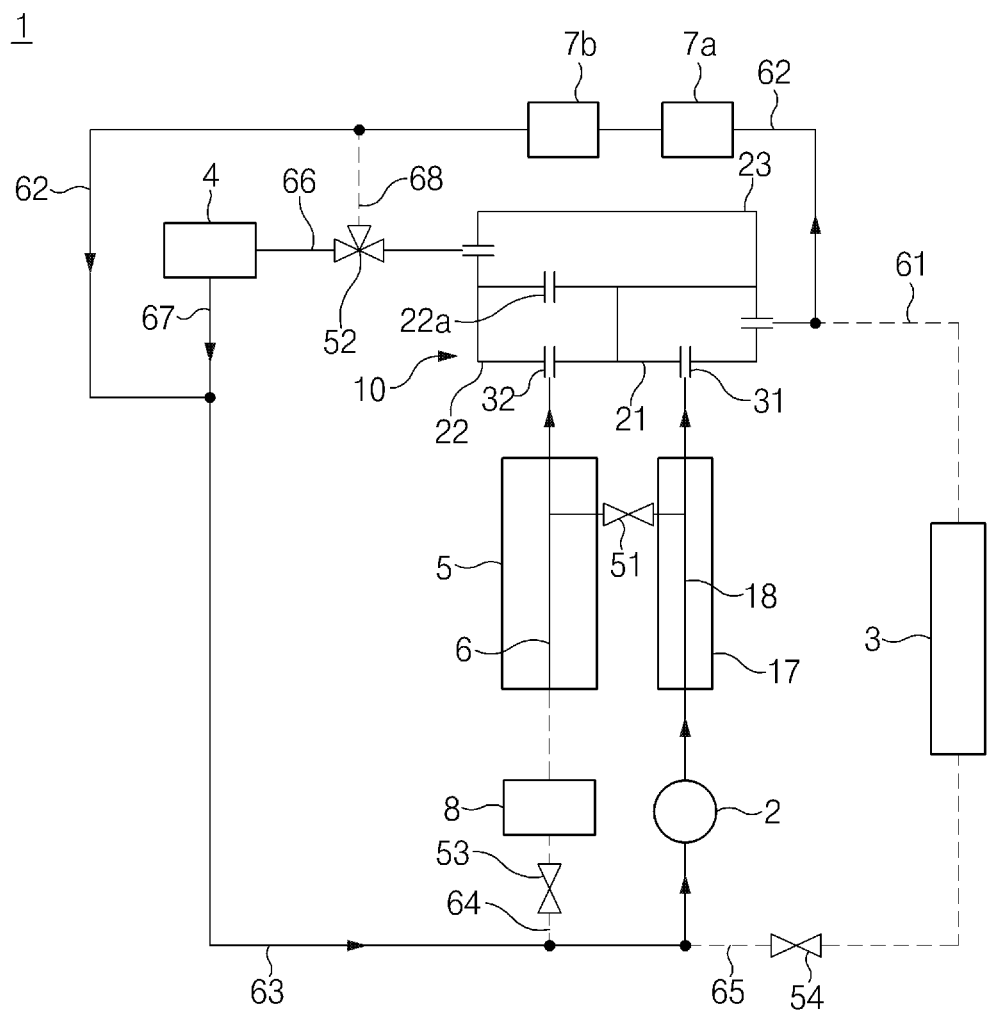
FIG. 11 illustrates a second operating state of an engine cooling system, according to an exemplary embodiment of the present disclosure.

FIG. 11 illustrates a second operating state of the engine cooling system in table 1, that is, a state in which the oil cooler 8 is not operated in a cold running condition of the engine. As the first valve 51 is opened, the coolant may flow into the coolant passage 6 of the cylinder block 5, such that the coolant may be supplied to the second water jacket 22 and the third water jacket 23. The second valve 52 may open the outlet port thereof communicating with the heater 4. As the coolant is supplied from the third water jacket 23 to the heater 4, the heater 4 may be operated. The coolant may be supplied to the first water jacket 21 by the operation of the water pump 2, such that the coolant may be supplied to the EGR cooler 7a and the EGR valve 7b. As the third valve 53 is closed, the oil cooler 8 may not operate, and as the fourth valve 54 is closed, the radiator 3 may not operate.

Figure 12:
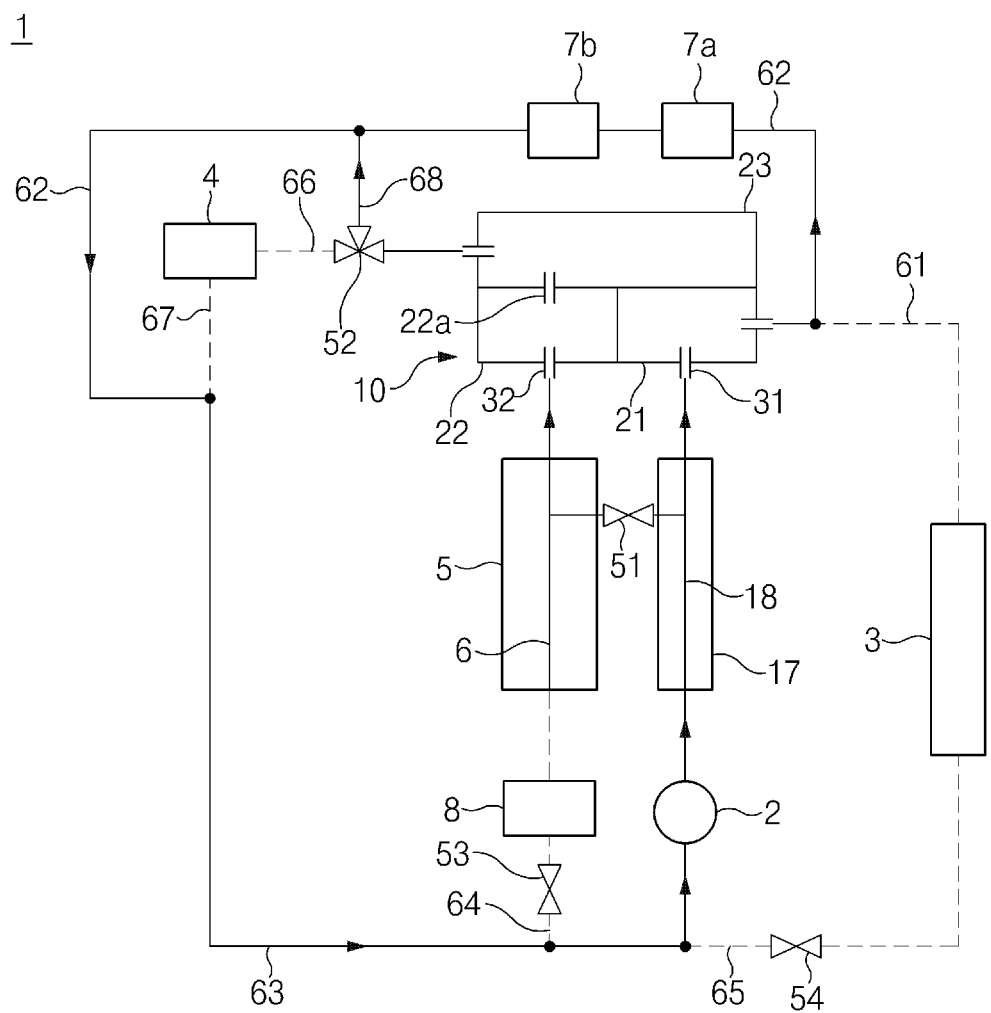
FIG. 12 illustrates a third operating state of an engine cooling system, according to an exemplary embodiment of the present disclosure.

FIG. 12 illustrates a third operating state of the engine cooling system in table 1, that is, a state in which the heater 4 and the oil cooler 8 are not operated in a cold running condition of the engine. As the first valve 51 is opened, the coolant may flow into the coolant passage 6 of the cylinder block 5, such that the coolant may be supplied to the second water jacket 22 and the third water jacket 23. The second valve may open the outlet port thereof communicating with the second passage 62. As the coolant is bypassed from the third water jacket 23 to the second passage 62, the heater 4 may be stopped. The coolant may be supplied to the first water jacket 21 by the operation of the water pump 2, such that the coolant may be supplied to the EGR cooler 7a and the EGR valve 7b. As the third valve 53 is closed, the oil cooler 8 may not operate, and as the fourth valve 54 is closed, the radiator 3 may not operate.

Figure 13:
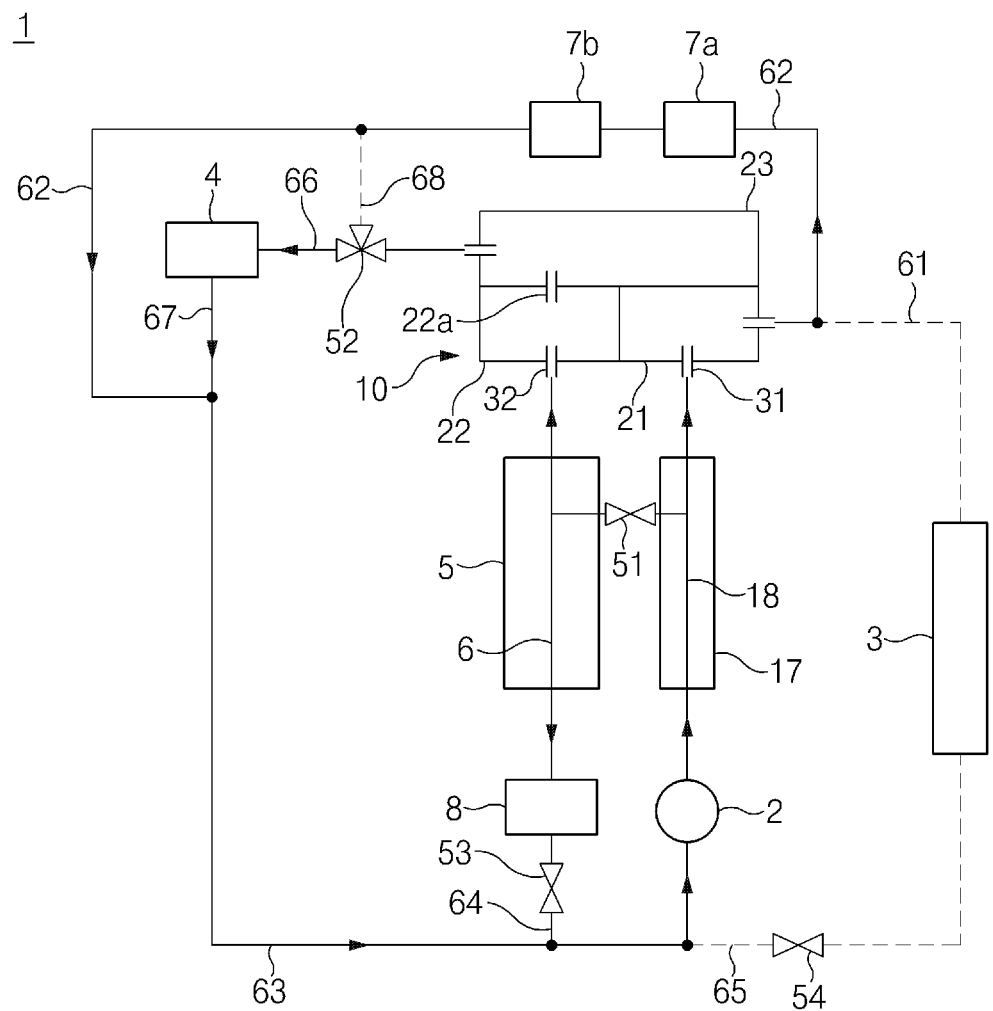
FIG. 13 illustrates a fourth operating state of an engine cooling system, according to an exemplary embodiment of the present disclosure.

FIG. 13 illustrates a fourth operating state of the engine cooling system in table 1, that is, a state in which the heater 4 and the oil cooler 8 are operated before the coolant is introduced into the radiator 3. As the first valve 51 is opened, the coolant may flow into the coolant passage 6 of the cylinder block 5, such that the coolant may be supplied to the second water jacket 22 and the third water jacket 23. The second valve may open the outlet port thereof communicating with the heater 4. As the coolant is supplied from the third water jacket 23 to the heater 4, the heater 4 may be operated. The coolant may be supplied to the first water jacket 21 by the operation of the water pump 2, such that the coolant may be supplied to the EGR cooler 7a and the EGR valve 7b. As the third valve 53 is opened, the oil cooler 8 may be operated, and as the fourth valve 54 is closed, the radiator 3 may not operate.

Figure 14:
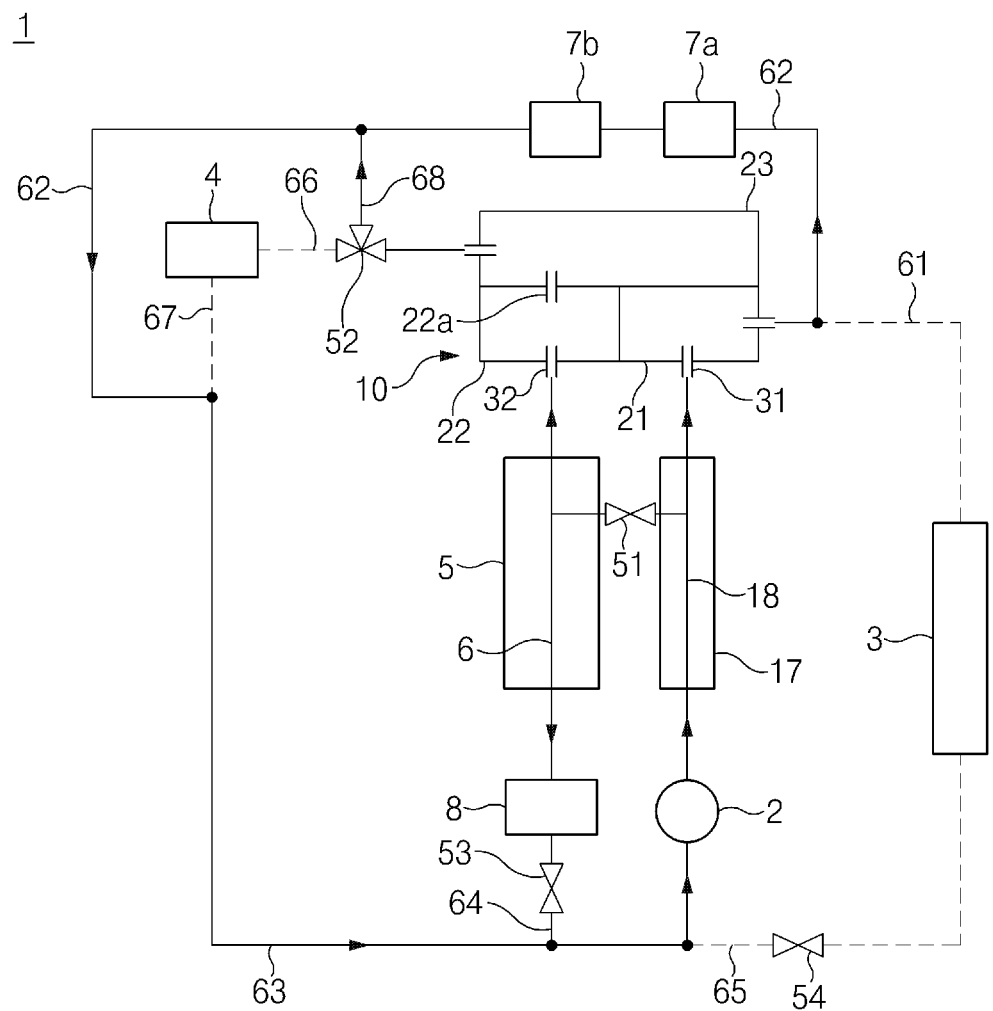
FIG. 14 illustrates a fifth operating state of an engine cooling system, according to an exemplary embodiment of the present disclosure.

FIG. 14 illustrates a fifth operating state of the engine cooling system in table 1, that is, a state in which the heater 4 is not operated and the oil cooler 8 is operated before the coolant is introduced into the radiator 3. As the first valve 51 is opened, the coolant may flow into the coolant passage 6 of the cylinder block 5, such that the coolant may be supplied to the second water jacket 22 and the third water jacket 23. The second valve 52 may open the outlet port thereof communicating with the second passage 62. As the coolant is bypassed from the third water jacket 23 to the second passage 62, the heater 4 may not be operated. The coolant may be supplied to the first water jacket 21 by the operation of the water pump 2, such that the coolant may be supplied to the EGR cooler 7a and the EGR valve 7b. As the third valve 53 is opened, the oil cooler 8 may be operated, and as the fourth valve 54 is closed, the radiator 3 may not operate.

Figure 15:
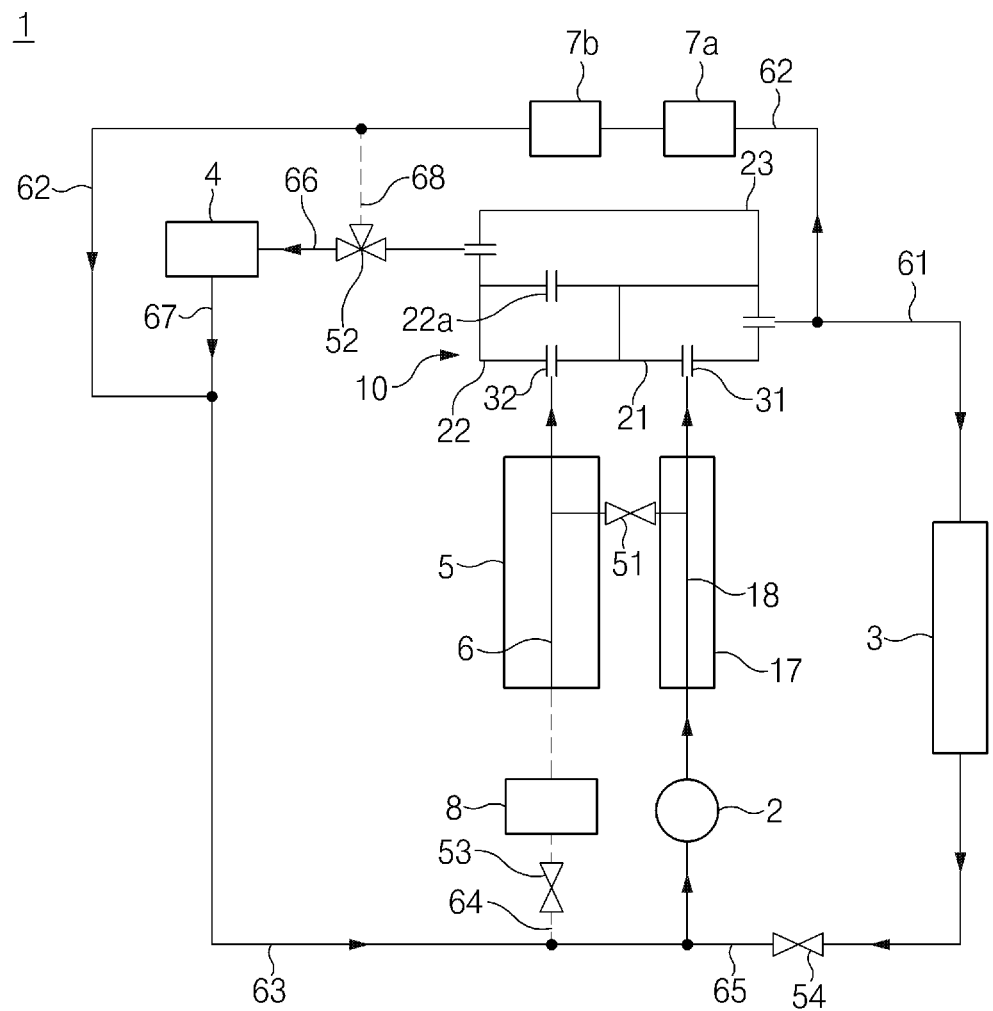
FIG. 15 illustrates a sixth operating state of an engine cooling system, according to an exemplary embodiment of the present disclosure.

FIG. 15 illustrates a sixth operating state of the engine cooling system in table 1, that is, a state in which the radiator 3 and the heater 4 are operated and the oil cooler 8 is not operated in a hot running condition of the engine. As the first valve 51 is opened, the coolant may flow into the coolant passage 6 of the cylinder block 5, such that the coolant may be supplied to the second water jacket 22 and the third water jacket 23. The second valve 52 may open the outlet port thereof communicating with the heater 4. As the coolant is supplied from the third water jacket 23 to the heater 4, the heater 4 may be operated. The coolant may be supplied to the first water jacket 21 by the operation of the water pump 2, such that the coolant may be supplied to the EGR cooler 7a and the EGR valve 7b. As the third valve 53 is closed, the oil cooler 8 may not operate. As the fourth valve 54 is opened, the coolant may be supplied from the first water jacket 21 to the radiator 3, thereby allowing the radiator 3 to operate.

Figure 16:
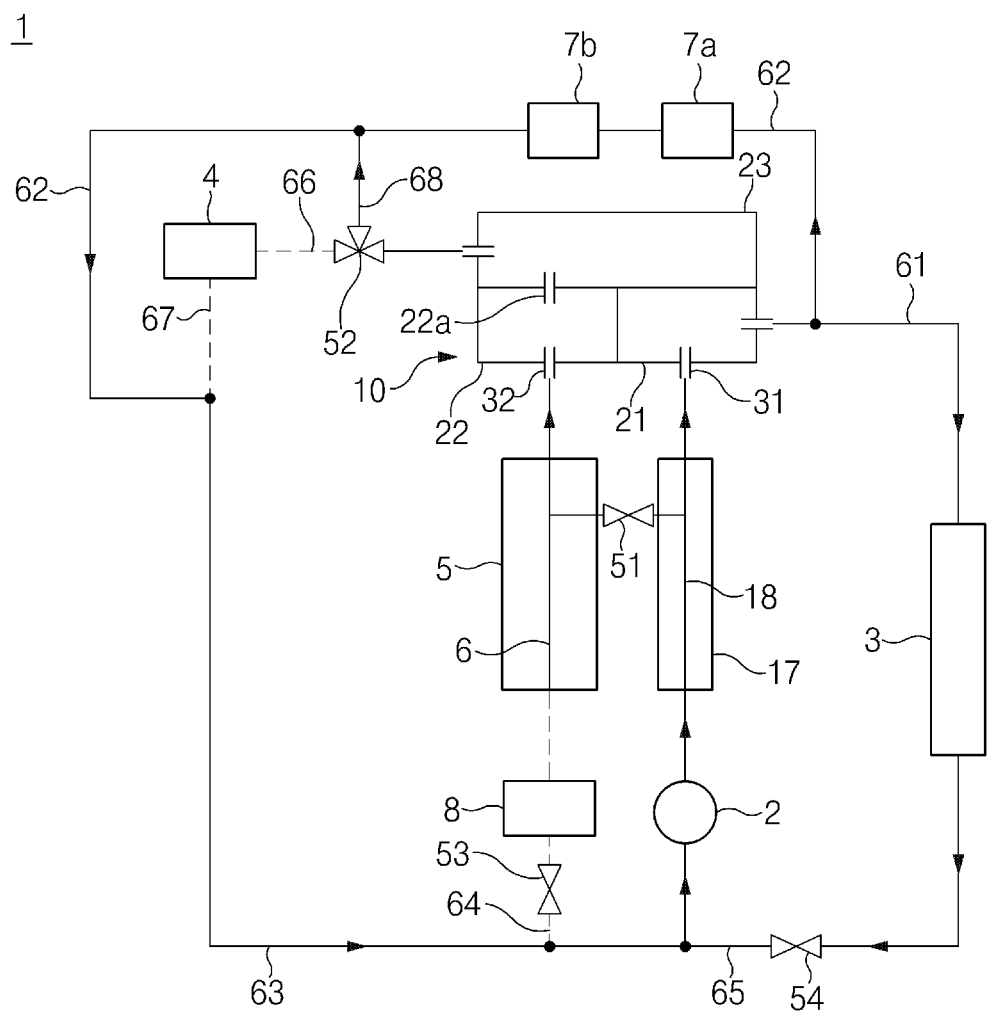
FIG. 16 illustrates a seventh operating state of an engine cooling system, according to an exemplary embodiment of the present disclosure.

FIG. 16 illustrates a seventh operating state of the engine cooling system in table 1, that is, a state in which the radiator 3 is operated and the heater 4 and the oil cooler 8 are not operated in a hot running condition of the engine. As the first valve 51 is opened, the coolant may flow into the coolant passage 6 of the cylinder block 5, such that the coolant may be supplied to the second water jacket 22 and the third water jacket 23. The second valve 52 may open the outlet port thereof communicating with the second passage 62. As the coolant is bypassed from the third water jacket 23 to the second passage 62, the heater 4 may not operate. The coolant may be supplied to the first water jacket 21 by the operation of the water pump 2, such that the coolant may be supplied to the EGR cooler 7a and the EGR valve 7b. As the third valve 53 is closed, the oil cooler 8 may not operate. As the fourth valve 54 is opened, the coolant may be supplied from the first water jacket 21 to the radiator 3, thereby allowing the radiator 3 to operate.

Figure 17:
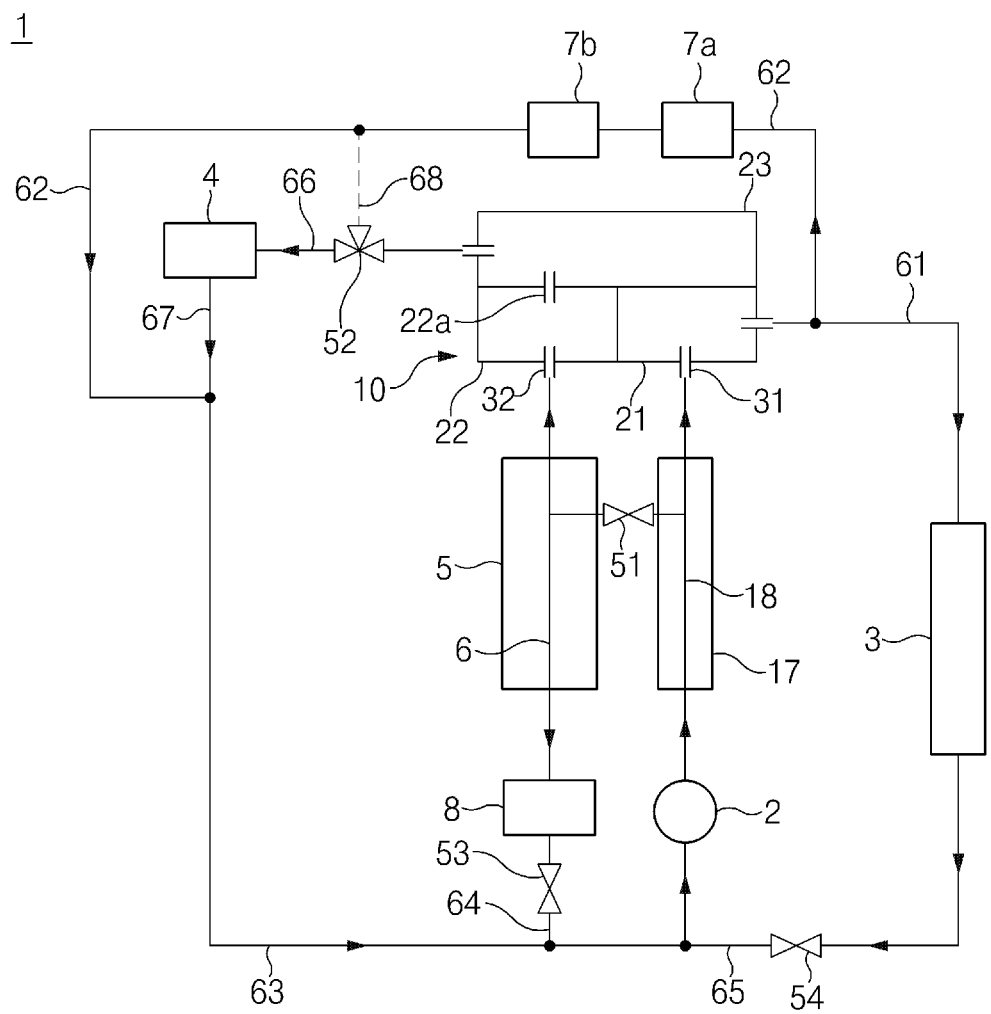
FIG. 17 illustrates an eighth operating state of an engine cooling system, according to an exemplary embodiment of the present disclosure.

FIG. 17 illustrates an eighth operating state of the engine cooling system in table 1, that is, a state in which the radiator 3, the heater 4 and the oil cooler 8 are operated in a hot running condition of the engine. As the first valve 51 is opened, the coolant may flow into the coolant passage 6 of the cylinder block 5, such that the coolant may be supplied to the second water jacket 22 and the third water jacket 23. The second valve 52 may open the outlet port thereof communicating with the heater 4. As the coolant is supplied from the third water jacket 23 to the heater 4, the heater 4 may be operated. The coolant may be supplied to the first water jacket 21 by the operation of the water pump 2, such that the coolant may be supplied to the EGR cooler 7a and the EGR valve 7b. As the third valve 53 is opened, the oil cooler 8 may be operated. As the fourth valve 54 is opened, the coolant may be supplied from the first water jacket 21 to the radiator 3, thereby allowing the radiator 3 to operate.

Figure 18:
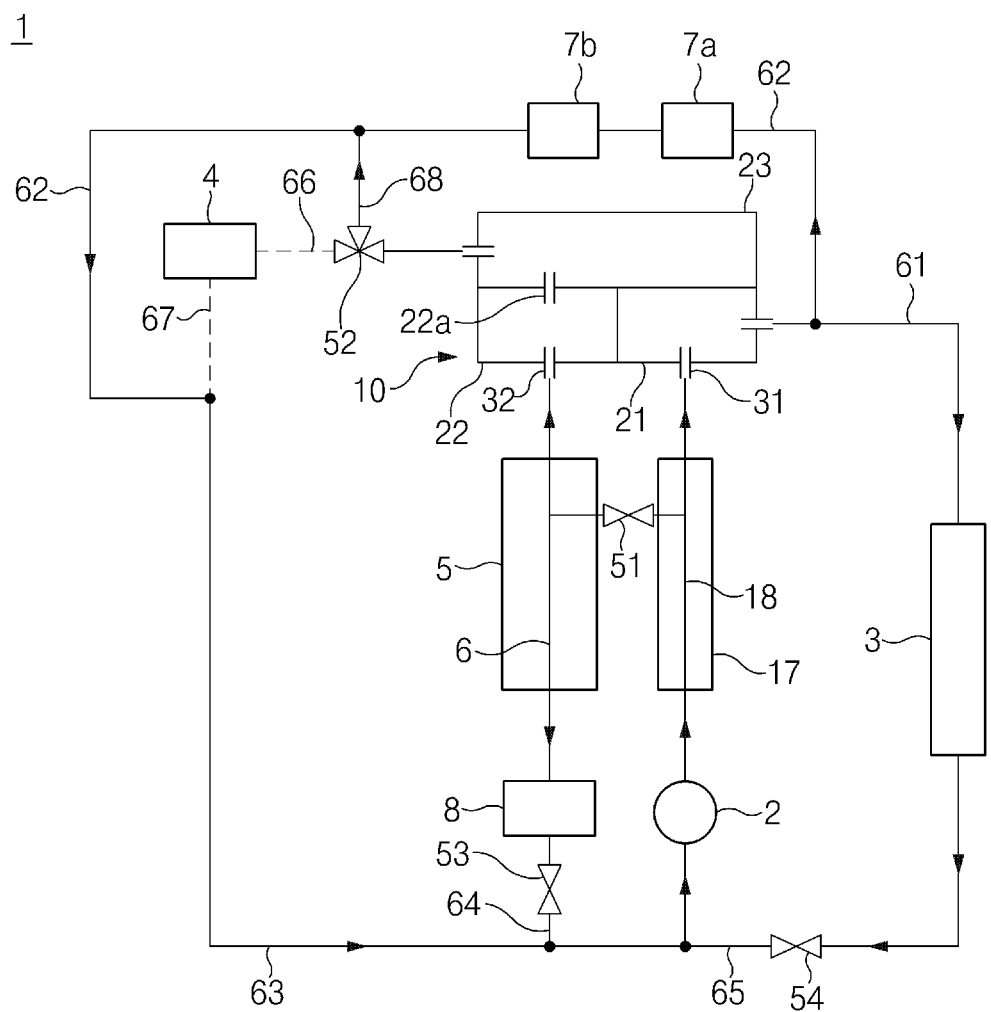
FIG. 18 illustrates a ninth operating state of an engine cooling system, according to an exemplary embodiment of the present disclosure.

FIG. 18 illustrates a ninth operating state of the engine cooling system in table 1, that is, a state in which the radiator 3 is operated, the heater 4 is not operated, and the oil cooler 8 is operated in a hot running condition of the engine. As the first valve 51 is opened, the coolant may flow into the coolant passage 6 of the cylinder block 5, such that the coolant may be supplied to the second water jacket 22 and the third water jacket 23. The second valve 52 may open the outlet port thereof communicating with the second passage 62. As the coolant is bypassed from the third water jacket 23 to the second passage 62, the heater 4 may not operate. The coolant may be supplied to the first water jacket 21 by the operation of the water pump 2, such that the coolant may be supplied to the EGR cooler 7a and the EGR valve 7b. As the third valve 53 is opened, the oil cooler 8 may be operated. As the fourth valve 54 is opened, the coolant may be supplied from the first water jacket 21 to the radiator 3, thereby allowing the radiator 3 to operate.

According to exemplary embodiments of the present disclosure, as the coolant flows through the first water jacket 21, the recessed combustion chamber 19 of the cylinder head and the combustion chamber of the cylinder may be appropriately cooled by the coolant.

According to exemplary embodiments of the present disclosure, as the exhaust manifold 20 is integrated into the cylinder head 10, the cost and weight (approximately 1.7 kg) may be significantly reduced.

According to exemplary embodiments of the present disclosure, by preventing the coolant from being supplied to the second water jacket 22 and the third water jacket 23 at the initial starting of the engine, the temperature of the exhaust gas discharged from the exhaust manifold 20 is not lowered. Thus, an increase in catalyst light-off time may be prevented and emissions such as NOx may be significantly reduced.

According to exemplary embodiments of the present disclosure, by efficiently controlling the flow of the coolant with respect to the cylinder head 10 and the cylinder block 5, friction in the cylinder may be reduced and coolant warm-up time may be shortened. Thus, fuel efficiency (approximately 1%) may be significantly improved.

According to exemplary embodiments of the present disclosure, a conventional layout of the engine may easily be employed without requiring significant changes.

As set forth above, as the coolant flows through the first water jacket, it can cool the recessed combustion chamber of the cylinder head and the combustion chamber of the cylinder appropriately, thereby lowering the combustion temperature and significantly improving fuel efficiency.

In addition, as the exhaust manifold is integrated into the cylinder head, this structure can significantly reduce costs of manufacture and weight.

Furthermore, by preventing the coolant from being supplied to the second water jacket and the third water jacket at the initial starting of the engine, the temperature of the exhaust gas discharged from the exhaust manifold is not lowered, thereby preventing an increase in catalyst light-off time. Thus, emissions such as NOx can be significantly reduced during the initial starting of the engine.

Moreover, the coolant flow in the cylinder head and the cylinder block is efficiently controlled, thereby reducing friction in the cylinder and shortening the coolant warm-up time. Thus, fuel efficiency can be significantly improved.

Furthermore, a conventional layout of the engine can easily be employed without requiring significant changes.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An engine cooling system, comprising:
   a cylinder head having a first water jacket disposed adjacent to a combustion chamber, and a second water jacket and a third water jacket surrounding an exhaust manifold and communicating with each other;
   a cylinder block having a first coolant passage defined therein, the first coolant passage communicating with the second water jacket;
   an external coolant duct directly attached to an outer surface of the cylinder block, the external coolant duct having a second coolant passage defined therein, the second coolant passage communicating with the first water jacket;
   a water pump supplying a coolant to the coolant passage of the external coolant duct; and
   a first valve having an inlet connected to the second coolant passage of the external coolant duct, and an outlet connected to the first coolant passage of the cylinder block;
   wherein the first water jacket is fluidly separated from the second water jacket and the third water jacket within the cylinder head housing;
   wherein the first water jacket is positioned to contact a bottom of the exhaust manifold; and
   wherein the exhaust manifold is surrounded by the first water jacket, the second water jacket, and the third water jacket.

2. The engine cooling system according to claim 1, wherein one end of the external coolant duct is connected to the water pump, and
   the other end of the external coolant duct is connected to the first water jacket.

3. The engine cooling system according to claim 1, wherein an exit of the third water jacket is connected to an inlet of a heater.

4. The engine cooling system according to claim 3, wherein a second valve is disposed between the exit of the third water jacket and the heater, and
   the second valve controls a direction of flow of coolant discharged from the third water jacket to adjust an amount of the coolant flowing into the heater.

5. The engine cooling system according to claim 3, wherein coolant discharged from the heater is recirculated to the water pump.

6. The engine cooling system according to claim 1, wherein the first coolant passage of the cylinder block is connected to an oil cooler.

7. The engine cooling system according to claim 6, wherein a third valve is disposed on an exit side of the oil cooler, and
   the oil cooler is operated or stopped by opening or closing the third valve.

8. The engine cooling system according to claim 1, wherein an exit of the first water jacket is connected to an inlet of a radiator.

9. The engine cooling system according to claim 8, wherein coolant discharged from the radiator is recirculated to the water pump.

10. The engine cooling system according to claim 9, wherein a fourth valve is disposed between the radiator and the water pump, and
    the radiator is operated or stopped by opening or closing the fourth valve.

* * * * *